(12) United States Patent
Ina et al.

(10) Patent No.: US 7,605,885 B2
(45) Date of Patent: Oct. 20, 2009

(54) ELECTRODE SUBSTRATE AND DISPLAY DEVICE INCLUDING THE SAME

(75) Inventors: Keiichi Ina, Mie (JP); Keisuke Yoshida, Nara (JP); Ichiro Shiraki, Mie (JP); Mutsumi Nakajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 11/576,771

(22) PCT Filed: Aug. 15, 2005

(86) PCT No.: PCT/JP2005/014896
§ 371 (c)(1),
(2), (4) Date: Nov. 29, 2007

(87) PCT Pub. No.: WO2006/038382

PCT Pub. Date: Apr. 13, 2006

(65) Prior Publication Data

US 2008/0094530 A1    Apr. 24, 2008

(30) Foreign Application Priority Data

Oct. 5, 2004    (JP) .............................. 2004-292980

(51) Int. Cl.
*G02F 1/1335*    (2006.01)
(52) U.S. Cl. ...................................... 349/106
(58) Field of Classification Search ............ 349/106
See application file for complete search history.

(56) References Cited

U.S. PATENT DOCUMENTS 5,144,288 A    9/1992    Hamada et al.
5,822,026 A    10/1998    Matsuo (Continued)

FOREIGN PATENT DOCUMENTS

| JP | 3-64046 B2 | 10/1991 |
|---|---|---|
| JP | 11-119254 A | 4/1999 |
| JP | 2001-051286 A | 2/2001 |
| WO | 95/22782 A1 | 8/1995 |

OTHER PUBLICATIONS

Official Communication for PCT Application No. PCT/JP2005/014896; mailed Sep. 20, 2005.

*Primary Examiner*—Sung H Pak
(74) *Attorney, Agent, or Firm*—Keating & Bennett, LLP

(57) ABSTRACT

A first electrode substrate of the present invention includes a first signal line, a second signal line, a third signal line, a first pixel electrode, a second pixel electrode, and a third pixel electrode. The first signal line, the second signal line and the third signal line extend in a first direction and in parallel to one another. The first pixel electrode is electrically connected to the first signal line. The second pixel electrode is adjacent to the first pixel electrode in the first direction, and is electrically connected to the second signal line. The third pixel electrode is adjacent to the second pixel electrode in the row direction, crossing the first direction, via the second signal line therebetween, and is electrically connected to the third signal line. A capacitance value of a parasitic capacitor formed between the first pixel electrode and the second pixel electrode is smaller than a capacitance value of a parasitic capacitor formed between the first pixel electrode and the third pixel electrode.

12 Claims, 16 Drawing Sheets

U.S. PATENT DOCUMENTS 5,966,189 A 10/1999 Matsuo
6,275,274 B1 8/2001 Kanemori et al.
6,686,985 B1 2/2004 Tanaka et al.
7,394,513 B2 * 7/2008 Andou et al. ............... 349/145

* cited by examiner

ELECTRODE SUBSTRATE AND DISPLAY DEVICE INCLUDING THE SAME

BACKGROUND OF THE INVENTION

1. Field of the Invention

The present invention relates to an electrode substrate and a display device including the same.

2. Description of the Related Art

Types of liquid crystal display devices that are operated by an active matrix driving method include color liquid crystal display devices using active matrix substrates (electrode substrates). A color liquid crystal display device includes an active matrix substrate, a counter substrate opposing the active matrix substrate and including a common electrode, a liquid crystal layer interposed between the substrates, and a color filter provided on the common electrode side. The color filter includes red (R) regions, green (G) regions and blue (B) regions arranged in a predetermined arrangement so that each region corresponds to one of a plurality of pixel electrodes provided on the active matrix substrate. An R region forms a red (R) pixel, a G region a green (G) pixel, and a B region a blue (B) pixel. Arrangements of the pixels of these three colors include a delta arrangement as disclosed in Japanese Patent Publication for Opposition No. 3-64046 (Patent Document 1), for example.

FIG. 15 is a schematic plan view showing an active matrix substrate 500 of a conventional liquid crystal display device including pixels arranged in a delta arrangement.

FIG. 16 is a partial plan view showing, on an enlarged scale, a portion of the active matrix substrate 500.

The active matrix substrate 500 includes a gate driver 502 and a source driver 503. A plurality of gate bus lines 504 extend in parallel to one another from the gate driver 502. A plurality of source bus lines 505 extend in parallel to one another from the source driver 503 at right angles to the direction of the gate bus lines 504. The gate bus lines 504 and the source bus lines 505 cross each other in a display section 501. A TFT 506 connected to both the gate bus line 504 and the source bus line 505 is provided in the vicinity of each of the intersections between the gate bus lines 504 and the source bus lines 505. One end of the TFT 506 is connected to a pixel electrode 507. A storage capacitor element 509 is electrically connected to each of the pixel electrodes 507.

In the active matrix substrate 500, a parasitic capacitor is formed between adjacent pixel electrodes 507, etc. Therefore, when an image is displayed by a conventional liquid crystal display device including the active matrix substrate 500, the potential of the pixel electrode 507 is varied by the charge stored in the parasitic capacitor, thus decreasing the image display quality.

The decrease in the image display quality due to a parasitic capacitor will now be described with reference to the drawings.

FIG. 17 is a plan view schematically showing a parasitic capacitor formed in the active matrix substrate 500.

Generally three types of parasitic capacitors are formed in the active matrix substrate 500. The first parasitic capacitor is a parasitic capacitor Csd formed between a source bus line 505 and a pixel electrode 507. The second parasitic capacitor is a parasitic capacitor Cpp formed between adjacent pixel electrodes 507. The third parasitic capacitor is a parasitic capacitor Cps formed between a pixel electrode 507 and a storage capacitor element 509 that is electrically connected to an adjacent pixel electrode 507.

Among these types of parasitic capacitors, the parasitic capacitor Csd can be classified further into two types of parasitic capacitors. One is a parasitic capacitor Csd1 formed between a pixel electrode 507 and a source bus line 505 that is connected to the pixel electrode 507 via the TFT 506. The other one is a parasitic capacitor Csd2 formed between a pixel electrode 507 and a source bus line 505 that receives a display signal of a display color different from that of the pixel electrode 507.

The parasitic capacitor Cpp can be classified into a parasitic capacitor Cppno formed between pixel electrodes 507 adjacent to each other in the direction in which the source bus line 505 extends, and a parasitic capacitor Cppsl formed between pixel electrodes 507 that are adjacent to each other with a source bus line 505 therebetween and that are connected to different gate bus lines 504 (i.e., pixel electrodes 507 provided along different rows).

As is the parasitic capacitor Cpp, the parasitic capacitor Cps can be classified into two types. Specifically, one is a parasitic capacitor Cpsno formed between a first pixel electrode 507 and a storage capacitor element 509 that is electrically connected to a second pixel electrode 507 adjacent to the first pixel electrode 507 in the direction in which the source bus line 505 extends. The other one is a parasitic capacitor Cpss1 formed between a first pixel electrode 507 and a storage capacitor element 509 that is electrically connected to a second pixel electrode 507, wherein the first and second pixel electrodes 507 are adjacent to each other with a source bus line 505 therebetween and are connected to different gate bus lines 504 (i.e., provided along different rows).

With the parasitic capacitors Csd2, Cppno, Cppsl, Cpsno and Cpssl, among these parasitic capacitors, the amount of potential of the pixel electrode 507 to be varied differs from row to row due to the difference between the types of the adjacent pixel electrodes 507. Therefore, there occurs a luminance non-uniformity among rows (horizontal stripes), thus decreasing the image display quality.

SUMMARY OF THE INVENTION

The present invention has been made in view of the problem that the image display quality decreases due to these parasitic capacitors, and has an object to suppress the occurrence of the luminance difference among horizontal lines (horizontal stripes) and to thereby realize a desirable image display quality.

A first electrode substrate of the present invention includes a first signal line, a second signal line, a third signal line, a first pixel electrode, a second pixel electrode, and a third pixel electrode. The first signal line, the second signal line and the third signal line extend in a first direction and in parallel to one another. The first pixel electrode is electrically connected to the first signal line. The second pixel electrode is adjacent to the first pixel electrode in the first direction, and is electrically connected to the second signal line. The third pixel electrode is adjacent to the second pixel electrode in the row direction, crossing the first direction, via the second signal line therebetween, and is electrically connected to the third signal line.

In the first electrode substrate of the present invention, a capacitance value of a parasitic capacitor formed between the first pixel electrode and the second pixel electrode is smaller than a capacitance value of a parasitic capacitor formed between the first pixel electrode and the third pixel electrode.

The first pixel electrode and the second pixel electrode are adjacent to each other in a direction in which the signal lines extend (the first direction). Therefore, the parasitic capacitor Cppno is formed between the first pixel electrode and the second pixel electrode. The parasitic capacitor Cppno promotes the occurrence of the luminance difference among horizontal lines (horizontal stripes). On the other hand, the first pixel electrode and the third pixel electrode are adjacent to each other via the second signal line therebetween and are arranged in different rows. The parasitic capacitor Cppsl is formed between the first pixel electrode and the third pixel electrode. The parasitic capacitor Cppsl suppresses the occurrence of the luminance difference among horizontal lines (horizontal stripes). In the first electrode substrate of the present invention, the capacitance value of the parasitic capacitor Cppno is smaller than the capacitance value of the parasitic capacitor Cppsl. Therefore, it is possible to effectively suppress the occurrence of the luminance difference among horizontal lines (horizontal stripes) and to realize a desirable image display quality.

In the first electrode substrate of the present invention, a distance between the first pixel electrode and the second pixel electrode may be longer than a distance between the first pixel electrode and the third pixel electrode.

With such a configuration, the layer thickness of the parasitic capacitor Cppno formed between the first pixel electrode and the second pixel electrode is larger than the layer thickness of the parasitic capacitor Cppsl formed between the first pixel electrode and the third pixel electrode. Therefore, the capacitance value of the parasitic capacitor Cppno is smaller than the capacitance value of the parasitic capacitor Cppsl.

As described above, the parasitic capacitor Cppno promotes the occurrence of the luminance difference among horizontal lines (horizontal stripes). On the other hand, the parasitic capacitor Cppsl suppresses the occurrence of the luminance difference among horizontal lines (horizontal stripes). Therefore, with this configuration, it is possible to effectively suppress the occurrence of the luminance difference among horizontal lines and to realize a desirable image display quality. In the present specification, the distance between adjacent pixel electrodes refers to the length of the shortest line between the peripheries of the pixel electrodes.

A second electrode substrate of the present invention includes a first signal line a second signal line, a third signal line, a first pixel electrode, a second pixel electrode, a third pixel electrode, and a storage capacitor element. The first signal line, the second signal line and the third signal line extend in a first direction and in parallel to one another. The first pixel electrode is electrically connected to the first signal line. The second pixel electrode is adjacent to the first pixel electrode in the first direction, and is electrically connected to the second signal line. The third pixel electrode is adjacent to the second pixel electrode in the row direction, crossing the first direction, via the second signal line therebetween, and is electrically connected to the third signal line. The storage capacitor element is electrically connected to the first pixel electrode.

In the second electrode substrate of the present invention, the capacitance value of the parasitic capacitor formed between the storage capacitor electrode and the second pixel electrode is smaller than the capacitance value of the parasitic capacitor formed between the storage capacitor electrode and the third pixel electrode.

The parasitic capacitor Cpsno formed between the storage capacitor electrode connected to the first pixel electrode and the second pixel electrode promotes the occurrence of the luminance difference among horizontal lines (horizontal stripes). On the other hand, the parasitic capacitor Cpss1 formed between the storage capacitor electrode connected to the first pixel electrode and the third pixel electrode suppresses the occurrence of the luminance difference among horizontal lines (horizontal stripes). In the second electrode substrate of the present invention, the capacitance value of the parasitic capacitor Cpsno is smaller than the capacitance value of the parasitic capacitor Cpss1. Therefore, it is possible to effectively suppress the occurrence of the luminance difference among horizontal lines (horizontal stripes) and to realize a desirable image display quality.

In the second electrode substrate of the present invention, a distance between the storage capacitor electrode and the second pixel electrode may be longer than a distance between the storage capacitor electrode and the third pixel electrode.

With such a configuration, the layer thickness of the parasitic capacitor Cpsno formed between the storage capacitor electrode connected to the first pixel electrode and the second pixel electrode is larger than the layer thickness of the parasitic capacitor Cpss1 formed between the storage capacitor electrode connected to the first pixel electrode and the third pixel electrode. Therefore, the capacitance value of the parasitic capacitor Cpsno is smaller than the capacitance value of the parasitic capacitor Cpss1.

As described above, the parasitic capacitor Cpsno promotes the occurrence of the luminance difference among horizontal lines (horizontal stripes). On the other hand, the parasitic capacitor Cpss1 suppresses the occurrence of the luminance difference among horizontal lines (horizontal stripes). Therefore, it is possible to effectively suppress the occurrence of the luminance difference among horizontal lines and to realize a desirable image display quality.

In the second electrode substrate of the present invention, it is preferred that an area across which the storage capacitor electrode and the second pixel electrode overlap each other is smaller than an area across which the storage capacitor electrode and the third pixel electrode overlap each other.

With this configuration, the capacitance value of the parasitic capacitor Cpsno is smaller than the capacitance value of the parasitic capacitor Cpss1. As described above, the parasitic capacitor Cpsno promotes the occurrence of the luminance difference among horizontal lines (horizontal stripes). On the other hand, the parasitic capacitor Cpss1 suppresses the occurrence of the luminance difference among horizontal lines (horizontal stripes). Therefore, it is possible to effectively suppress the occurrence of the luminance difference among horizontal lines and to realize a desirable image display quality. The storage capacitor electrode and the third pixel electrode may not overlap each other.

In the first and second electrode substrates of the present invention, each of the first signal lines may meander in a rectangular wave pattern.

In the first and second electrode substrates of the present invention, the first pixel electrode, the second pixel electrode and the third pixel electrode may be arranged in a delta pattern.

With such a configuration, it is possible to more smoothly display a picture of nature, or the like, having many curves therein.

The electrode substrate of the present invention is not limited to those in which the pixel electrodes are arranged in a delta arrangement. Alternatively, the pixel electrodes may be arranged in a stripe arrangement or a square arrangement.

A display device of the present invention includes an electrode substrate of the present invention.

The display method of the display device of the present invention may be that of a liquid crystal display.

DETAILED DESCRIPTION OF PREFERRED EMBODIMENTS

Embodiments of the present invention will now be described with reference to the drawings.

Embodiment 1

Figure 1:
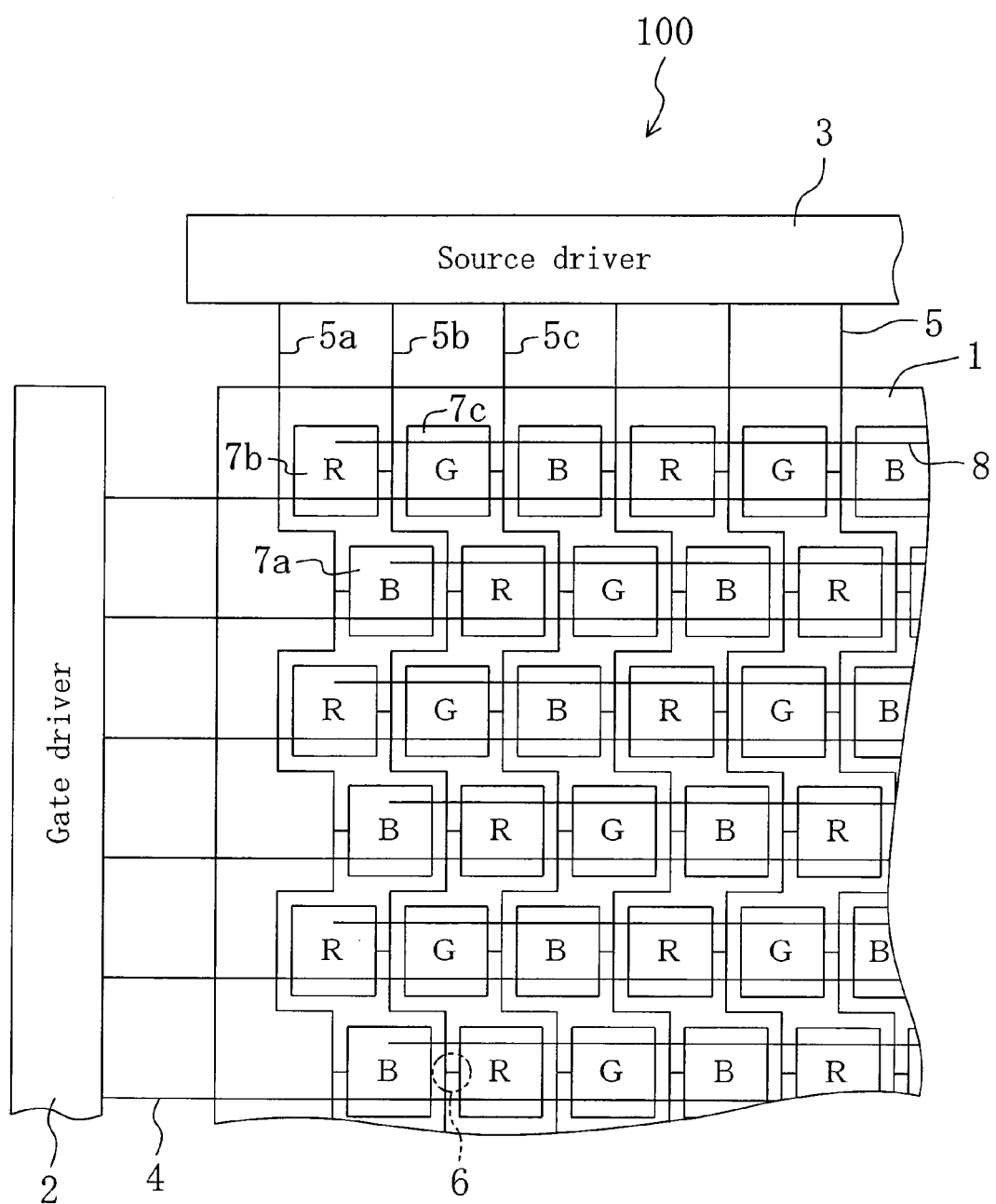
FIG. 1 is a schematic plan view showing an active matrix substrate 100 of Embodiment 1.

FIG. 1 is a schematic plan view showing an active matrix substrate 100 of Embodiment 1.

Figure 2:
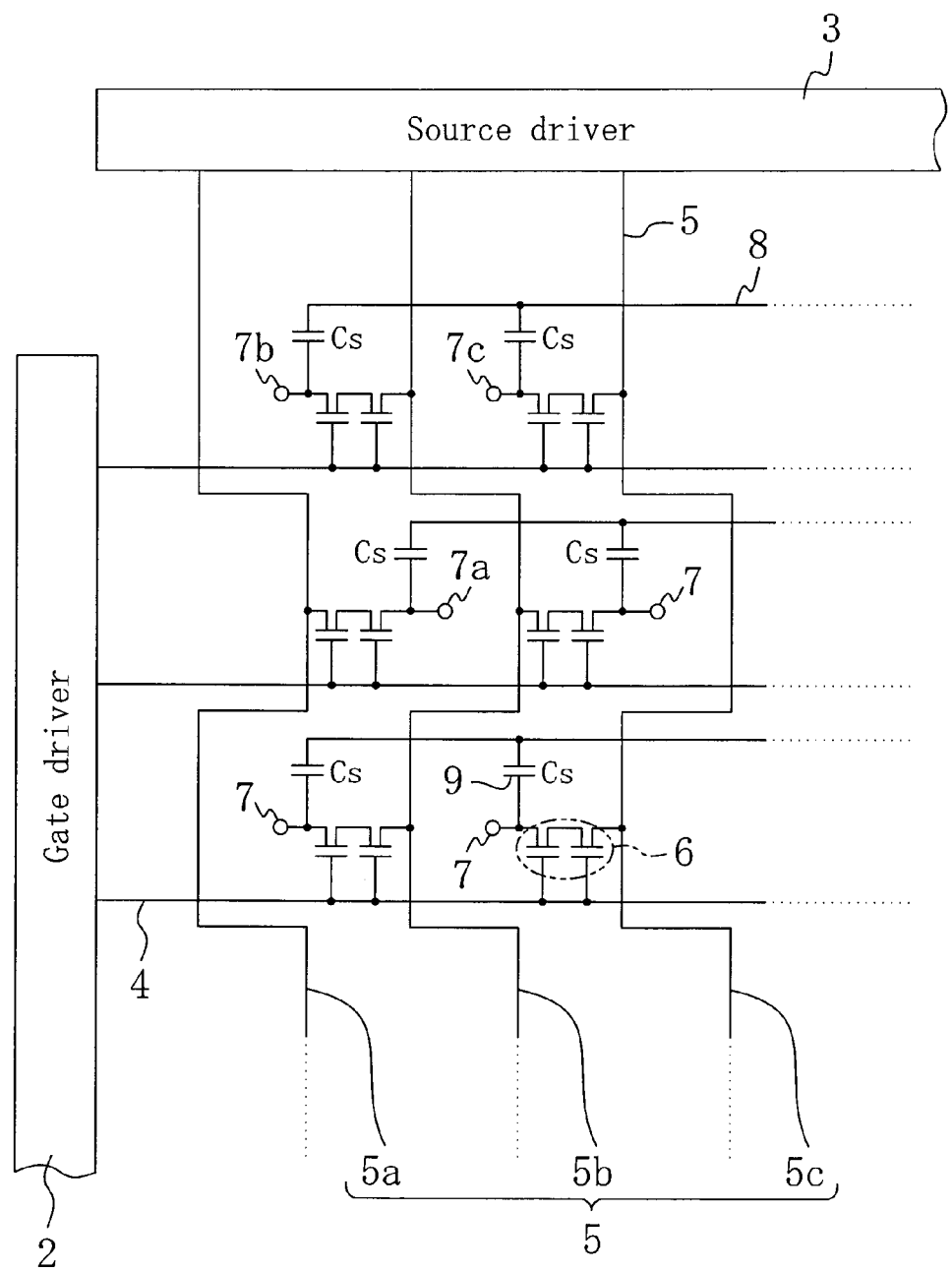
FIG. 2 is an equivalent circuit diagram of the active matrix substrate 100.

FIG. 2 is an equivalent circuit diagram of the active matrix substrate 100.

Figure 3:
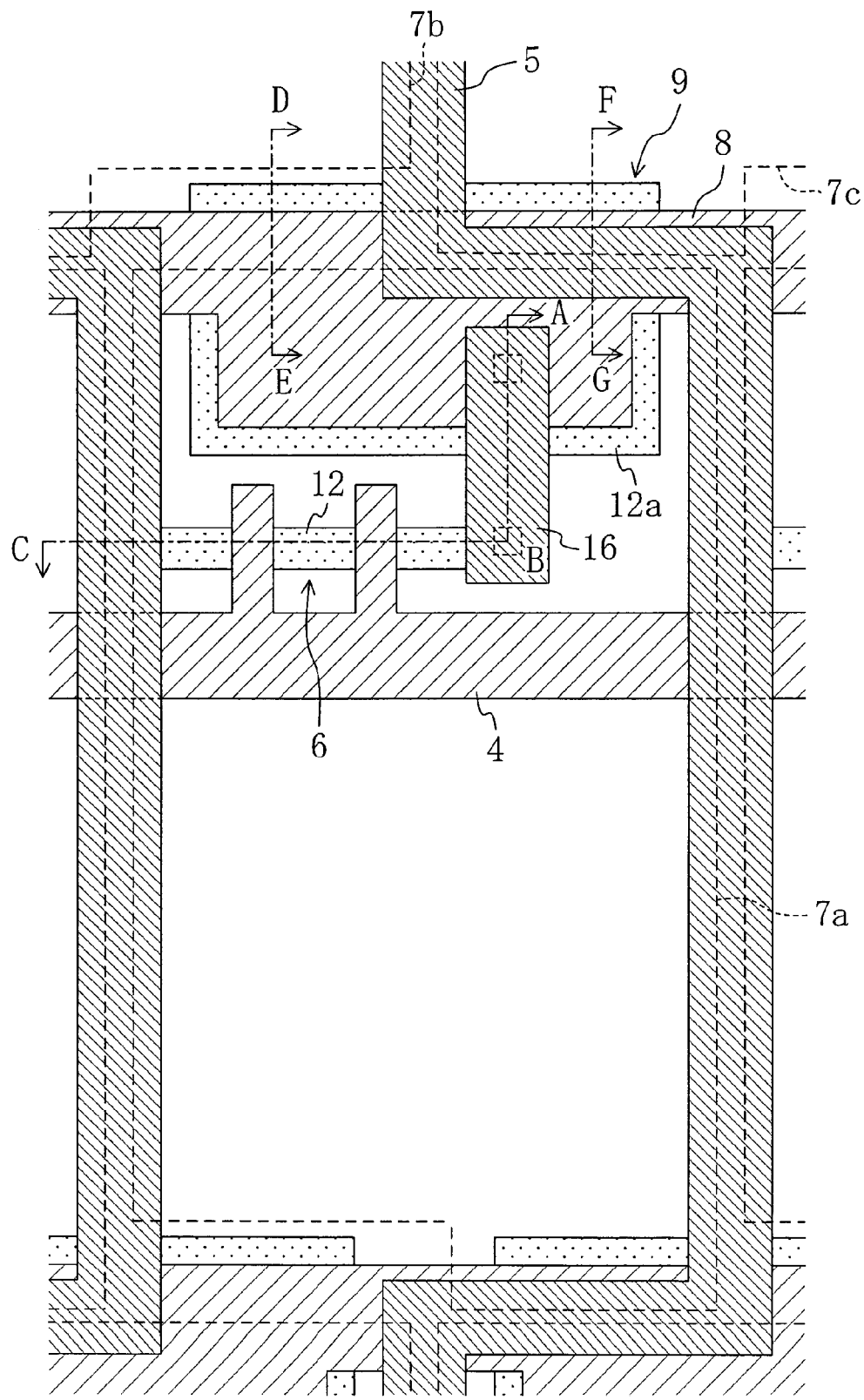
FIG. 3 is a partial plan view showing the active matrix substrate 100.

FIG. 3 is a partial plan view showing the active matrix substrate 100.

Figure 4:
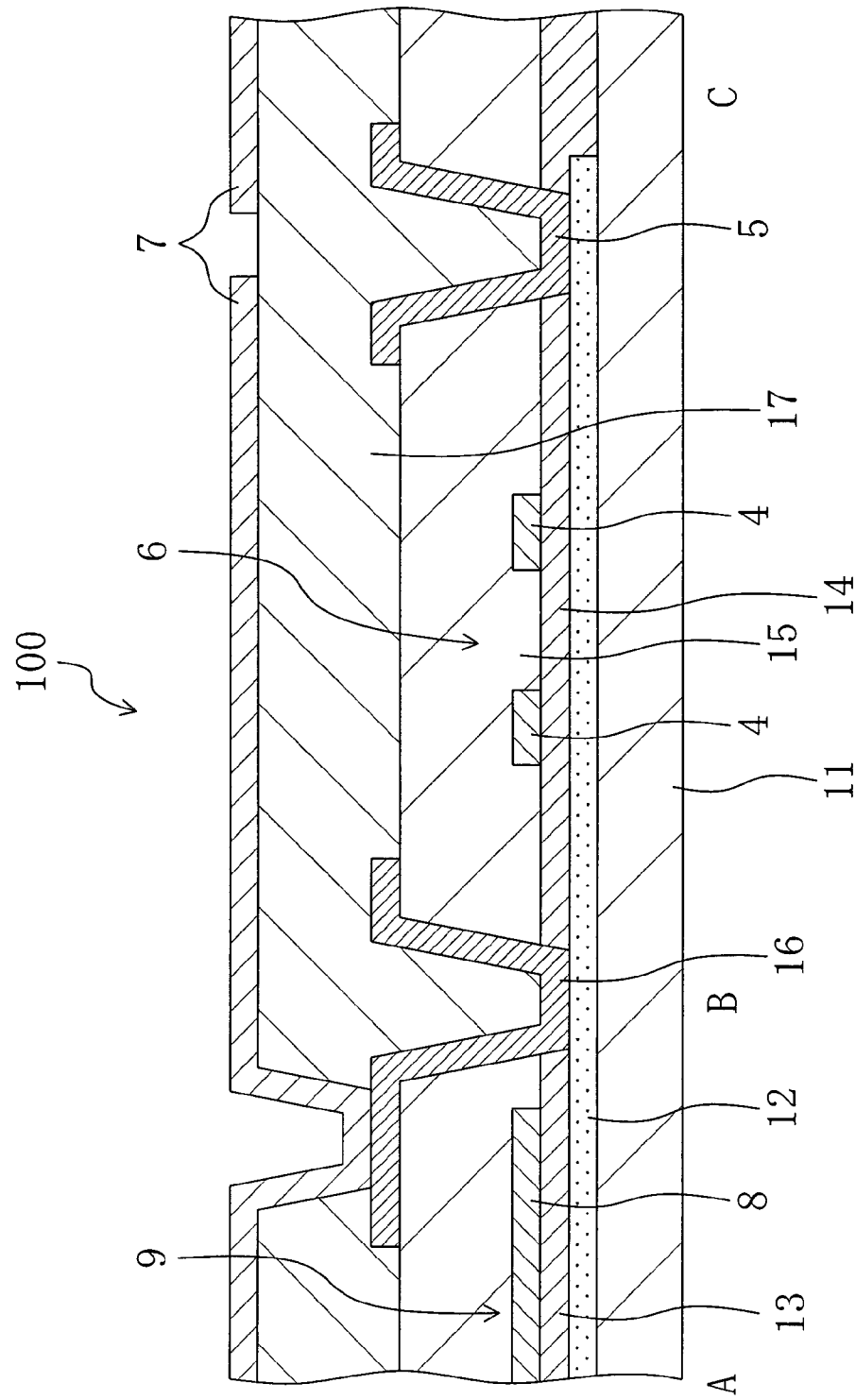
FIG. 4 is a schematic cross-sectional view taken along line A-B-C in FIG. 3.

FIG. 4 is a schematic cross-sectional view showing a portion cut out along cut line A-B-C in FIG. 3.

Figure 5:
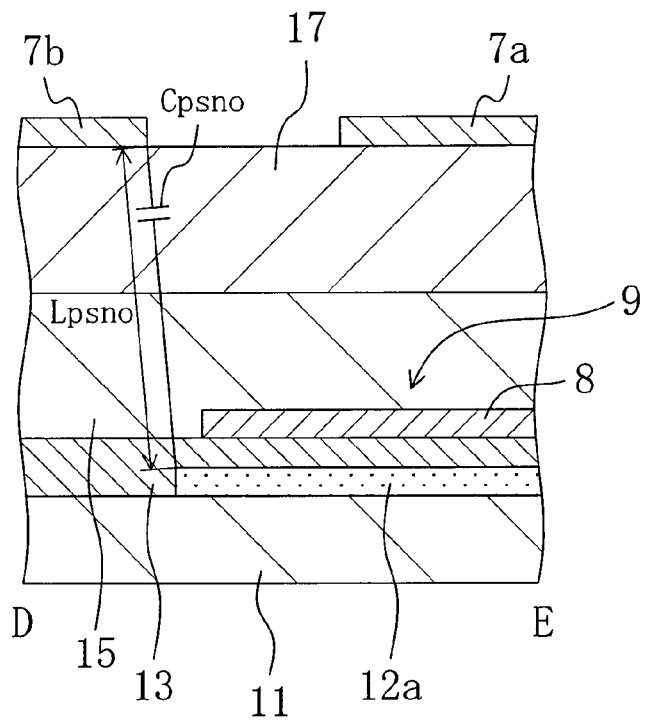
FIG. 5 is a schematic cross-sectional view taken along line D-E in FIG. 3.

FIG. 5 is a schematic cross-sectional view showing a portion cut out along cut line D-E in FIG. 3.

Figure 6:
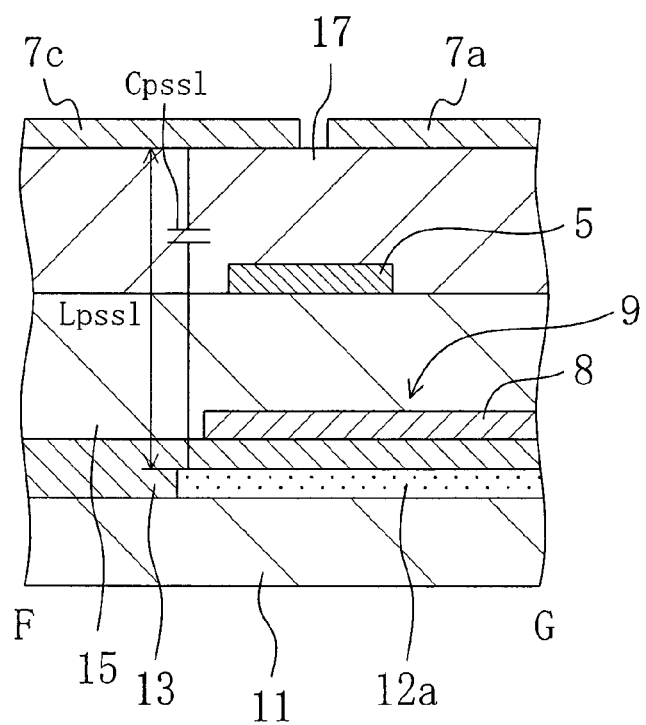
FIG. 6 is a schematic cross-sectional view taken along line F-G in FIG. 3.

FIG. 6 is a schematic cross-sectional view showing a portion cut out along cut line F-G in FIG. 3.

The active matrix substrate 100 of Embodiment 1 includes a gate driver 2 and a source driver 3. A plurality of gate bus lines 4 extend in parallel to one another from the gate driver 2. A plurality of source bus lines 5 extend in parallel to one another from the source driver 3 so as to cross the gate bus lines 4 (typically at right angles) in a display section 1. Each of the source bus lines 5 meanders in a rectangular wave pattern.

A thin film transistor (hereinafter referred to as a "TFT") 6 is provided in the vicinity of each of the intersections between the gate bus lines 4 and the source bus lines 5. The TFT 6 is electrically connected to both the gate bus line 4 and the source bus line 5, and one end thereof is connected to a pixel electrode 7 via a drain electrode 16. The pixel electrodes 7 provided in the display section 1 are arranged in a delta arrangement.

Specifically, as shown in FIGS. 1 and 2, a first pixel electrode 7a electrically connected to a first source bus line 5a, a second pixel electrode 7b adjacent to the first pixel electrode 7a in the column direction (the direction in which the source bus line 5 extends) and electrically connected to a second source bus line 5b, and a third pixel electrode 7c adjacent to the second pixel electrode 7b in the row direction (the direction in which the gate bus line 4 extends) and electrically connected to a third source bus line 5c are arranged in a delta pattern. The first pixel electrode 7a is provided along a row different from the second pixel electrode 7b and the third pixel electrode 7c.

The pixel electrodes 7 are each for lighting one of red (R), green (G) and blue (B) subpixels. The pixel electrodes 7 for displaying R (hereinafter referred to as the "pixel electrodes 7R"), the pixel electrodes 7 for displaying G (hereinafter referred to as the "pixel electrodes 7G") and the pixel electrodes 7 for displaying B (hereinafter referred to as the "pixel electrodes 7B") are alternately arranged in the direction in which the gate bus line 4 extends (the horizontal direction in FIG. 1).

While the active matrix substrate 100 can be used in a full-color display device having three types of pixel electrodes 7, the matrix substrate of the present invention is not limited to this configuration. For example, the matrix substrate of the present invention may include four or more types of pixel electrodes, each for displaying a different color.

One end of the TFT 6 that is closer to the drain electrode 16 is connected to a semiconductor layer 12 of a storage capacitor element 9 (hereinafter "the semiconductor layer 12 of the storage capacitor element 9" is referred to also as "a storage capacitor electrode 12a") provided for each of the pixel electrodes 7. The storage capacitor electrode 12a is connected to the pixel electrode 7.

Referring to FIGS. 4 to 6, the configuration of the active matrix substrate 100 will now be described in greater detail.

The TFT 6 (see the cross section taken along line A-B-C in FIG. 4) includes the semiconductor layer 12, the gate bus line 4, the source bus line 5 and the drain electrode 16. The semiconductor layer 12 is provided on a substrate main body 11. A gate insulator 14 is provided on the semiconductor layer 12, and the gate bus line 4 is provided thereon. An interlayer insulator 15 is provided on the gate bus line 4. Moreover, the source bus line 5 is provided on the interlayer insulator 15. The source bus line 5 is connected to the semiconductor layer 12 via a contact hole running through the interlayer insulator 15 and the gate insulator 14. The drain electrode 16 is provided on the interlayer insulator 15. The drain electrode 16 is connected to the storage capacitor electrode 12a via a contact hole running through the interlayer insulator 15 and the gate insulator 14. A resin layer 17 is provided on the drain electrode 16. Moreover, the pixel electrode 7 is provided on the resin layer 17. The pixel electrode 7 and the drain electrode 16 are electrically connected to each other via a contact hole running through the resin layer 17.

This is also applicable in a case where the TFT 6 is of a top-gate structure, an inversely staggered structure, or the like. Moreover, this is also applicable in a case where the TFT 6 is of a Cs on Gate type (a driving method in which the storage capacitor line and the gate line are a shared line), or of a Cs on Common type (a driving method in which the storage capacitor line is provided separately from the gate line, and the potential thereof is varied as is the counter electrode).

The storage capacitor element 9 (see the cross section taken alone line A-B in FIG. 4 and that taken along line D-E in FIG. 5) includes the storage capacitor electrode 12a provided on the substrate main body 11, a dielectric layer 13 covering the storage capacitor electrode 12a, and a storage capacitor line 8 opposing the storage capacitor electrode 12a via the dielectric layer 13 therebetween. The storage capacitor electrode 12a and the drain electrode 16 are electrically connected to each other via a contact hole running through the interlayer insulator 15 and the dielectric layer 13.

The materials of the elements of the active matrix substrate 100 will now be described in detail.

The substrate main body 11 may be a glass substrate, a plastic substrate, a quartz substrate, or the like. The substrate main body 11 may be a glass substrate, or the like, with a base coat layer of silicon oxide ($SiO_2$), or the like, provided thereon.

The material of the gate bus line 4, the source bus line 5, the storage capacitor line 8 and the drain electrode 16 may be aluminum (Al), silver (Ag), tantalum (Ta), tungsten (W), etc.

The material of the semiconductor layer 12 may be amorphous silicon, single crystal silicon, etc.

The material of the dielectric layer 13, the gate insulator 14 and the interlayer insulator 15 may be silicon oxide, etc.

The material of the resin layer 17 may be TEOS (tetraethoxysilane), etc.

The materials of the elements described above are merely illustrative, and the present invention is not limited thereto.

The shape of the pixel electrode 7 in the active matrix substrate 100 will now be described with reference to the drawings.

Figure 7:
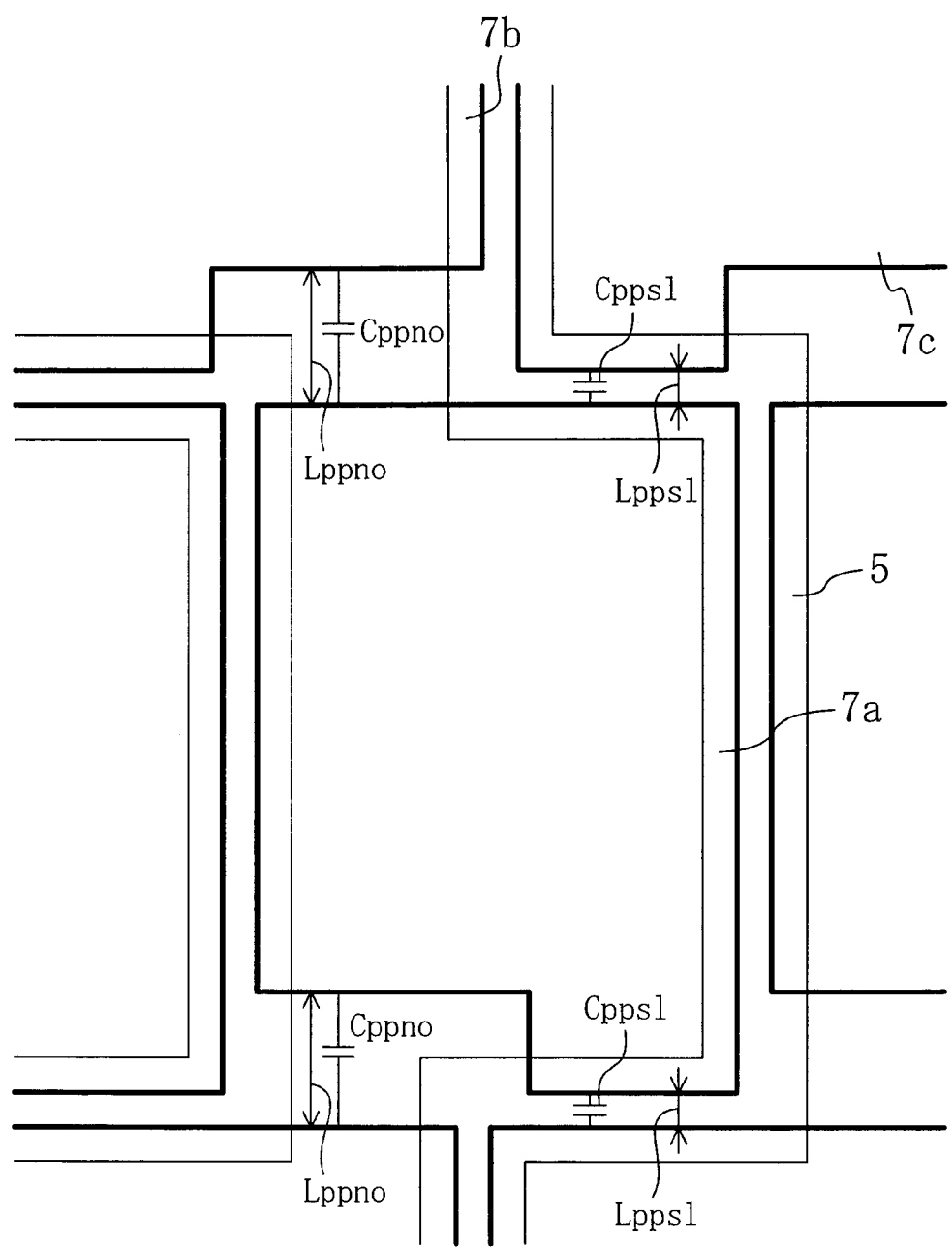
FIG. 7 is a plan view showing the shape and arrangement of a pixel electrode 7.

FIG. 7 is a plan view showing the shape and arrangement of the pixel electrode 7.

As shown in FIG. 7, the distance Lppno between the first pixel electrode 7a and the second pixel electrode 7b is longer than the distance Lpps1 between the first pixel electrode 7a and the third pixel electrode 7c. Therefore, the capacitance value of the parasitic capacitor Cppno formed between the first pixel electrode 7a and the second pixel electrode 7b is smaller than the capacitance value of the parasitic capacitor Cppsl formed between the first pixel electrode 7a and the third pixel electrode 7c.

The parasitic capacitor Cppno having a relatively small capacitance value in the active matrix substrate 100 promotes the occurrence of the luminance difference among horizontal lines (horizontal stripes). The parasitic capacitor Cppsl having a relatively large capacitance value in the active matrix substrate 100 acts to suppress the occurrence of the luminance difference among horizontal lines (horizontal stripes). Therefore, with the active matrix substrate 100, it is possible to effectively suppress the occurrence of the luminance difference among horizontal lines (horizontal stripes) and to realize a desirable image display quality.

The parasitic capacitor Cppno promotes the occurrence of the luminance difference among horizontal lines while the parasitic capacitor Cppsl suppresses the occurrence of the luminance difference among horizontal lines for the following reasons.

Figure 8:
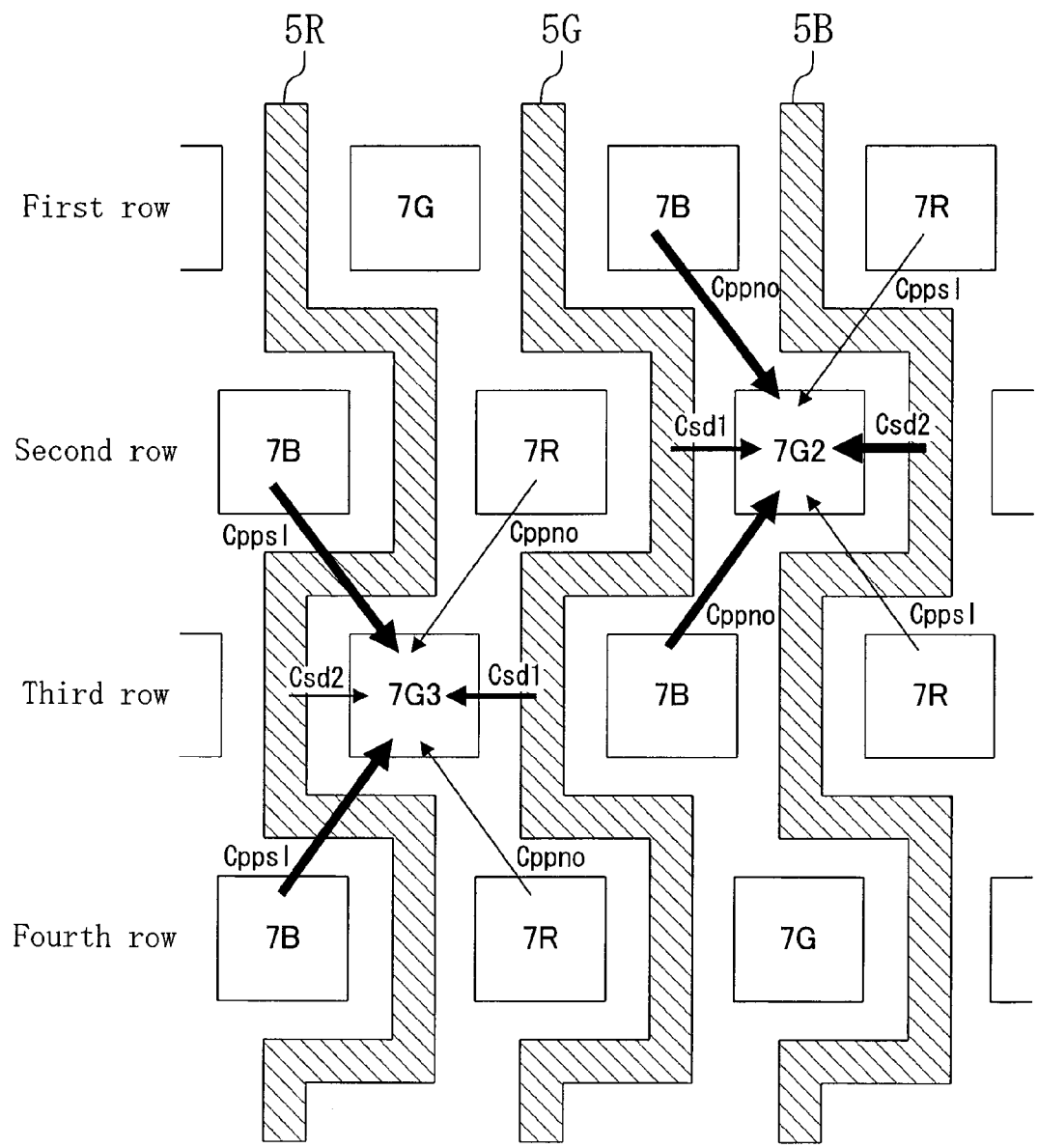
FIG. 8 is a plan view showing the active matrix substrate 1 for illustrating the correlation between the parasitic capacitor Cpp and the occurrence of the luminance non-uniformity among horizontal lines (horizontal stripes).

FIG. 8 is a plan view showing the active matrix substrate 100 for illustrating the correlation between the parasitic capacitor Cpp and the occurrence of the luminance non-uniformity among horizontal lines (horizontal stripes).

As an example, a normally-white display device using the active matrix substrate 100 will be described.

Consider a case where the display device displays orange across the entire screen, specifically, a case where the R pixels are lit with the highest gray level, the G pixels with an intermediate gray level and the B pixels with the lowest gray level. In this case, with a normally-white display device, the ascending order of potential variation of source bus lines is as follows: a source bus line 5R for receiving a signal for lighting R, a source bus line 5G for G, and a source bus line 5B for B.

With regard to a pixel electrode 7G2 for lighting G in the second row shown in FIG. 8 and a pixel electrode 7G3 in the third row, the amount of potential variation by the parasitic capacitor Csd1 formed between the pixel electrode and the source bus line 5G is the same between the pixel electrodes 7G2 and 7G3 because the source bus line 5G is shared, hence an equal potential variation. The potential variation for the source bus line 5B is greater than that for the source bus line 5R. Therefore, the amount of potential variation for the pixel electrode 7G2 by the parasitic capacitor Csd2 formed between the pixel electrode 7G2 and the source bus line 5B is greater than the amount of potential variation for the pixel electrode 7G3 by the parasitic capacitor Csd2 formed between the pixel electrode 7G3 and the source bus line 5R. Due to the difference in the amount of potential variation by the parasitic capacitor Csd2, there occurs a potential difference between the pixel electrode 7G2 for lighting G in the second row and the pixel electrode 7G3 in the third row, whereby the luminance non-uniformity among horizontal lines (horizontal stripes) is observed.

The relationship between the parasitic capacitor Csd and the potential (Vpix) of the pixel electrode 7 after the potential variation is as shown in Expression 1 below.

$$V\text{pix}=V\text{pix}0+(C sd1/C\text{pix})\Delta Vs1+(C sd2/C\text{pix})\Delta Vs2 \quad \text{(Expression 1)}$$

Herein, Vpix is the potential of the pixel electrode 7 after the potential variation. Vpix0 is the potential of the pixel electrode 7 before the potential variation, specifically, the potential applied to the pixel electrode 7 via the TFT 6 from the source bus line 5 that applies a data signal. Cpix is the sum of the capacitance values of capacitors for a pixel electrode 7 (the parasitic capacitor, the storage capacitor element, etc.). $\Delta Vs1$ is the voltage amplitude of the source bus line 5 that applies a data signal to a pixel electrode 7. $\Delta Vs2$ is the voltage amplitude of the source bus line 5 that does not apply a data signal to the pixel electrode 7.

In contrast, the amount of potential variation for the pixel electrode 7G2 by the parasitic capacitor Cppsl formed between the pixel electrode 7G2 and the pixel electrode 7R adjacent to the pixel electrode 7G2 via the source bus line 5 therebetween is smaller than the amount of potential variation for the pixel electrode 7G3 by the parasitic capacitor Cppsl formed between the pixel electrode 7G3 and the pixel electrode 7B adjacent to the pixel electrode 7G3 via the source bus line 5 therebetween. The potential variation difference decreases the potential difference, caused by the potential variation by Csd2, between the pixel electrode 7G2 for lighting G in the second row and the pixel electrode 7G3 in the third row. Therefore, the parasitic capacitor Cppsl reduces the variation of the potential of the pixel electrode by the parasitic capacitor Csd2.

On the other hand, the amount of potential variation for the pixel electrode 7G2 by the parasitic capacitor Cppno formed between the pixel electrode 7G2 and the pixel electrode 7B adjacent to the pixel electrode 7G2 without the source bus line 5 therebetween is greater than the amount of potential variation for the pixel electrode 7G3 by the parasitic capacitor Cppno formed between the pixel electrode 7G3 and the pixel electrode 7R adjacent to the pixel electrode 7G3 without the source bus line 5 therebetween. The potential variation difference increases the potential difference, caused by the potential variation by Csd2, between the pixel electrode 7G2 for lighting G in the second row and the pixel electrode 7G3 in the third row. Therefore, the parasitic capacitor Cppno promotes the variation of the potential of the pixel electrode by the parasitic capacitor Csd2.

Therefore, it is possible to effectively suppress the luminance difference among horizontal lines (horizontal stripes) by minimizing the capacitance value of the parasitic capacitor Cppno and maximizing the capacitance value of the parasitic capacitor Cppsl.

The relationship between the parasitic capacitor Cppno and the potential of the pixel electrode 7 after the potential variation is as shown in Expression 2 below.

$$V\text{pix}=V\text{pix}0+(C\text{pps}1/C\text{pix})\Delta V\text{pixs}1+ (C\text{ppno}/C\text{pix})\Delta V\text{pixno} \quad \text{(Expression 2)}$$

Herein, $\Delta V\text{pixs}1$ is the potential variation of a pixel electrode 7 that is adjacent via the source bus line 5 therebetween. $\Delta V\text{pixno}$ is the potential variation of a pixel electrode 7 that is adjacent without the source bus line 5 therebetween.

The method for making the capacitance value of the parasitic capacitor Cppno to be different from that of the parasitic capacitor Cppsl is not limited to the method in which the distances between the pixel electrodes 7 are made to be different from each other.

The parasitic capacitor Cps formed between the storage capacitor electrode 12a and the pixel electrode 7 will now be described in detail.

As shown in FIG. 3, in the active matrix substrate 100, the storage capacitor electrode 12a connected to the first pixel electrode 7a overlaps the third pixel electrode 7c and does not overlap the second pixel electrode 7b. As shown in FIGS. 5 and 6, the distance Lpss1 between the storage capacitor electrode 12a and the second pixel electrode 7b is shorter than the distance Lpsno between the storage capacitor electrode 12a and the third pixel electrode 7c. Therefore, the capacitance value of the parasitic capacitor Cpss1 formed between the storage capacitor electrode 12a and the third pixel electrode 7c is greater than the capacitance value of the parasitic capacitor Cpsno formed between the storage capacitor electrode 12a and the second pixel electrode 7b. The parasitic capacitor Cpss1 reduces the luminance difference among horizontal lines (horizontal stripes) for a reason similar to that for the parasitic capacitor Cppsl. On the other hand, the parasitic capacitor Cpsno promotes the luminance difference among horizontal lines (horizontal stripes) for a reason similar to that for the parasitic capacitor Cppno. Therefore, with the active matrix substrate 100, it is possible to effectively suppress the occurrence of the luminance difference among horizontal lines (horizontal stripes) and to realize a desirable image display quality.

In the active matrix substrate 100, the storage capacitor electrode 12a does not overlap the second pixel electrode 7b. However, the present invention is not limited to this. There is no limitation as long as the area across which the storage capacitor electrode 12a and the third pixel electrode 7c overlap each other is smaller than the area across which the storage capacitor electrode 12a and the second pixel electrode 7b overlap each other. Even with such a configuration, the parasitic capacitor Cpsno, which promotes the luminance difference among horizontal lines, can be made smaller than the parasitic capacitor Cpss1, whereby the effect of the present invention is sufficiently obtained.

The method for making the capacitance value of the parasitic capacitor Cpsno to be different from that of the parasitic capacitor Cpss1 is not limited to the method in which the distances between the pixel electrodes 7 and the storage capacitor electrode 12a are made to be different from each other.

A method for producing the active matrix substrate 100 will now be described in detail.

First, a base coat layer of silicon oxide ($SiO_2$) is deposited on a glass substrate, or the like, by a plasma CVD method, or the like, to form the substrate main body 11.

A thin film such as an amorphous silicon (Si) film is formed on the substrate main body 11 by using a plasma CVD method, or the like. The formed amorphous silicon film is subjected to a heat treatment and a laser annealing process to crystallize the amorphous silicon film, thus obtaining a crystallized silicon layer. The crystallized silicon layer is patterned into an intended shape by using a photolithography technique, or the like, to form the semiconductor layer 12.

The gate insulator 14 of silicon oxide ($SiO_2$), or the like, is formed on the semiconductor layer 12 by using a plasma CVD method, or the like.

A conductive layer of tantalum nitride, tungsten, etc., is formed on the gate insulator 14 by using a sputtering method, or the like. The conductive layer is patterned into an intended shape by using a photolithography technique, or the like, to form the storage capacitor line 8 and the gate bus line 4 simultaneously. The material of the storage capacitor line 8 and the gate bus line 4 is not limited to those described above, and may be a metal such as tantalum (Ta), tungsten (W), titanium (Ti), molybdenum (Mo), aluminum (Al) and copper (Cu), an alloy material or a compound material whose main component is such a metal, etc. The storage capacitor line 8 and the gate bus line 4 may be formed in a layered structure including a tantalum nitride layer and a tungsten layer, for example.

The source region and the drain region of the TFT 6 are formed by doping the semiconductor layer 12 with phosphorus (P), or the like. In this process, the previously-formed gate bus line 4 functions as a mask, whereby phosphorus (P), or the like, is not doped into the semiconductor layer 12 located under the gate bus line 4. A heat treatment is further performed so as to activate the impurity element doped into the semiconductor layer 12. In the active matrix substrate 100, an N channel is formed by doping phosphorus (P) into the semiconductor layer 12. When forming a P channel, it is preferred to dope boron (B), or the like, instead of phosphorus (P).

The interlayer insulator 15 of silicon nitride (SiN), silicon oxide ($SiO_2$), or the like, is formed by using a CVD method, or the like. The interlayer insulator 15 may be in a layered structure including a silicon nitride (SiN) layer and a silicon oxide ($SiO_2$) layer.

A contact hole for connecting the source bus line 5 with the semiconductor layer 12 and a contact hole for connecting the drain electrode 16 with the semiconductor layer 12 are formed in the interlayer insulator 15 and the gate insulator 14.

A conductive layer of tantalum nitride, tungsten (W), or the like, is formed by using a sputtering method, or the like. The conductive layer is patterned into an intended shape by using a photolithography technique, or the like, to form the drain electrode 16 and the source bus line 5 simultaneously. The material of the drain electrode 16 and the source bus line 5 is not limited to those described above, and may be a metal such as tantalum (Ta), tungsten (W), titanium (Ti), molybdenum (Mo), aluminum (Al) and copper (Cu), an alloy material or a compound material whose main component is such a metal, etc. The drain electrode 16 and the source bus line 5 may be formed in a layered structure of titanium (Ti)/aluminum (Al)/titanium (Ti).

Through a heat treatment, the semiconductor layer 12 is hydrogenized. The hydrogenization process is a process of terminating the dangling bond of the semiconductor layer 12 by hydrogen contained in the interlayer insulator 15 made of a silicon nitride (SiN) film, or the like.

The resin layer 17 of an organic insulative material such as TEOS (tetraethoxysilane) is formed. A contact hole for connecting the drain electrode 16 with the pixel electrode 7 is formed in the resin layer 17 by using a photolithography technique, or the like. A conductive layer of indium tin oxide (ITO) is formed by a sputtering method, or the like. The conductive layer is patterned into an intended shape by using a photolithography technique, or the like, to form the pixel electrode 7.

The active matrix substrate 100 can be produced by the process described above. The above production method is merely illustrative, and the present invention is not limited thereto.

Embodiment 2

Figure 9:
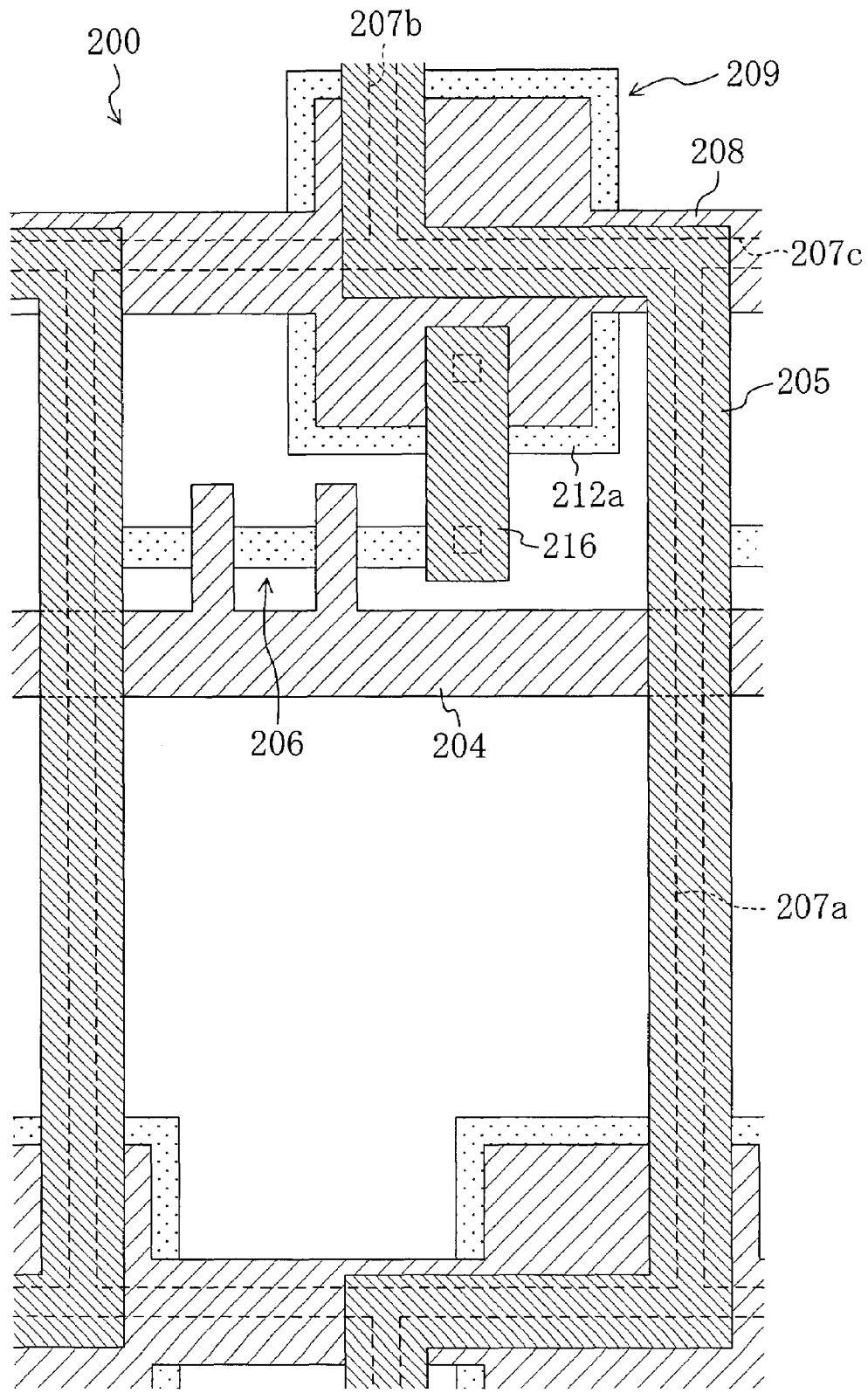
FIG. 9 is a partial plan view showing an active matrix substrate 200 of Embodiment 2.

FIG. 9 is a partial plan view showing an active matrix substrate 200 of Embodiment 2.

Figure 10:
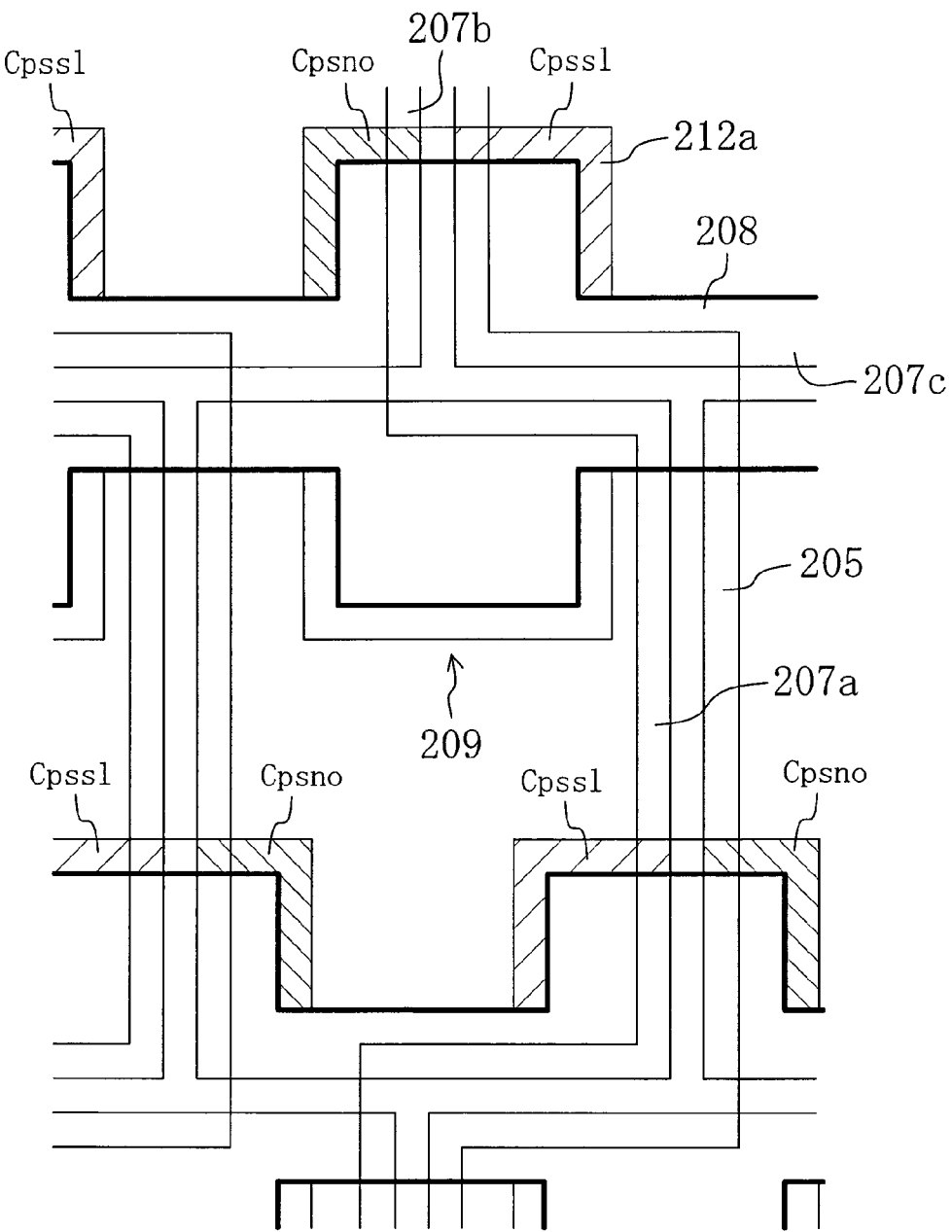
FIG. 10 is a plan view for illustrating the positional relationship between a pixel electrode 207 and a storage capacitor element 209.

FIG. 10 is a plan view for illustrating the positional relationship between a pixel electrode 207 and a storage capacitor element 209.

The active matrix substrate 200 includes a plurality of gate bus lines 204 extending in parallel to one another, and a plurality of source bus lines 205 extending in parallel to one another so as to cross the gate bus lines 204 (typically at right angles). Each of the source bus lines 205 meanders in a rectangular wave pattern.

A TFT 206 is provided in the vicinity of each of the intersections between the gate bus lines 204 and the source bus lines 205. The TFT 206 is electrically connected to both the gate bus line 204 and the source bus line 205, and one end thereof is connected to the pixel electrode 207 via a drain electrode 216. The pixel electrodes 207 are arranged in a delta arrangement.

The TFT 206 is connected to a semiconductor layer 212 of the storage capacitor element 209 (hereinafter "the semiconductor layer 212 of the storage capacitor element 209" is referred to also as "a storage capacitor electrode 212a"). The storage capacitor element 209 includes a storage capacitor line 208 extending parallel to the gate bus line 204.

The active matrix substrate 200 has the same structure as that of the active matrix substrate 100 except that the shape of each of the pixel electrodes 207 arranged in a matrix pattern, and shape and arrangement of the storage capacitor elements 209 are different from those of the active matrix substrate 100 of Embodiment 1. Therefore, the storage capacitor element 209 and the pixel electrode 207, which are different from those of Embodiment 1, will be described in detail.

In the active matrix substrate 200, the pixel electrode 207 is formed in a rectangular shape.

The storage capacitor electrode 212a, which is electrically connected to a first pixel electrode 207a, is formed in a vertically elongated shape with the longer side thereof parallel to the longer side of the pixel electrode 207. As shown in FIG. 10, the area across which the storage capacitor electrode 212a overlaps a third pixel electrode 207c is greater than the area across which the storage capacitor electrode 212a overlaps a second pixel electrode 207b. Therefore, also in the active matrix substrate 200, as in the active matrix substrate 100 of Embodiment 1, the capacitance value of the parasitic capacitor Cpsno, which promotes the occurrence of the luminance difference among horizontal lines (horizontal stripes), is smaller than the capacitance value of the parasitic capacitor Cpss1, which reduces the occurrence of the luminance difference among horizontal lines (horizontal stripes). Thus, it is possible to realize a desirable image display quality.

Embodiment 3

Figure 11:
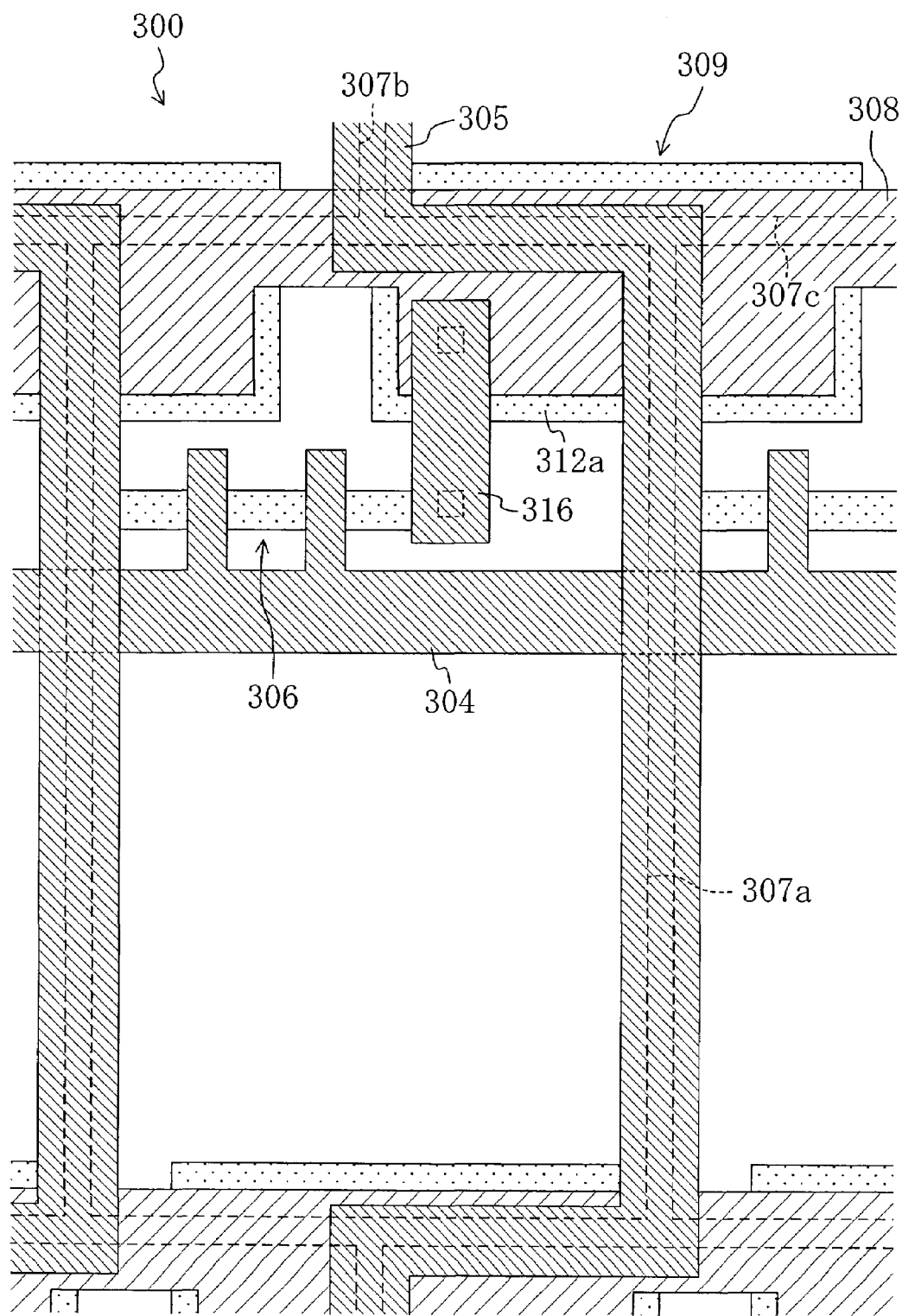
FIG. 11 is a partial plan view showing an active matrix substrate 300 of Embodiment 3.

FIG. 11 is a partial plan view showing an active matrix substrate 300 of Embodiment 3.

Figure 12:
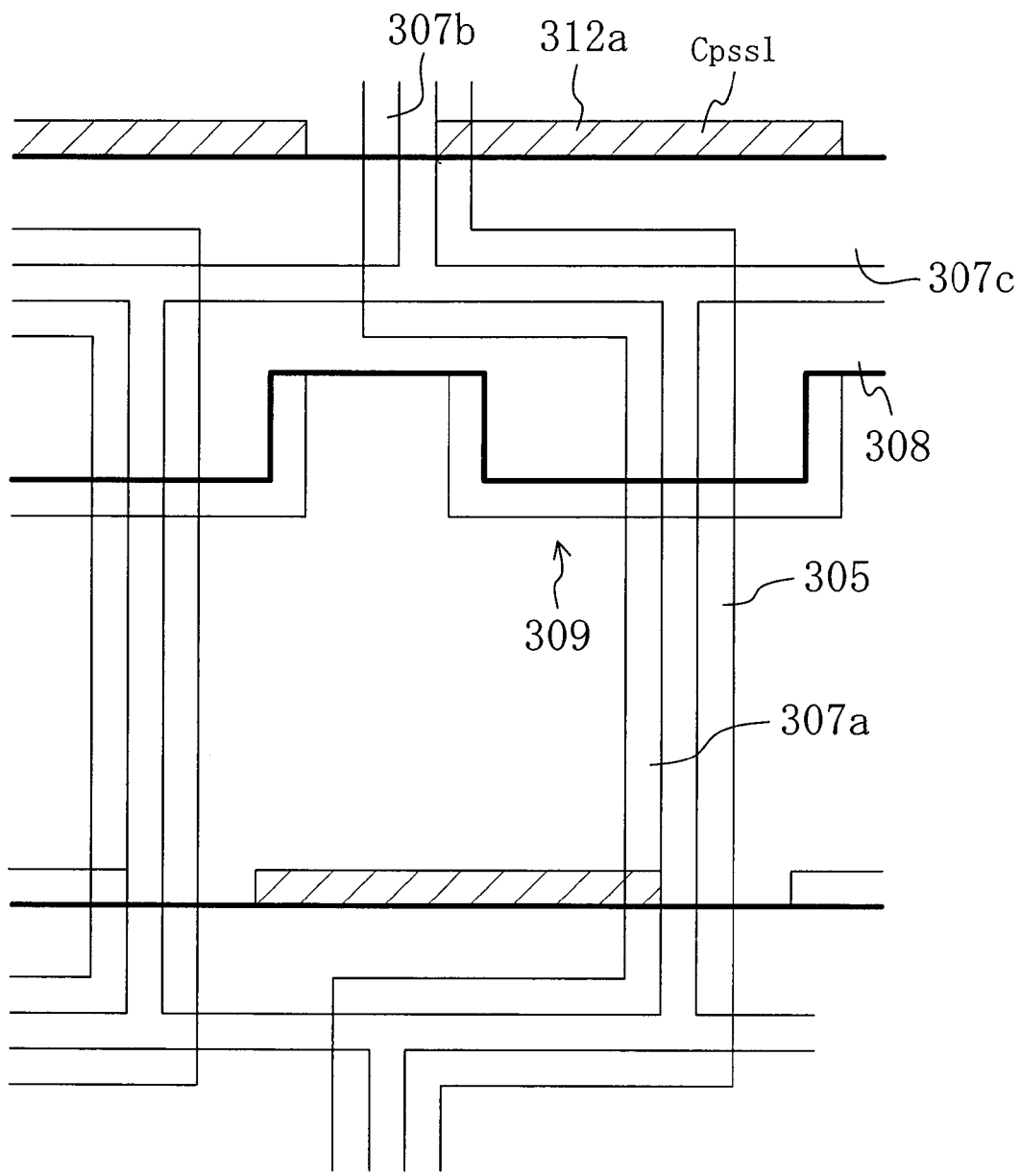
FIG. 12 is a plan view for illustrating the positional relationship between a pixel electrode 307 and a storage capacitor element 309.

FIG. 12 is a plan view for illustrating the positional relationship between a pixel electrode 307 and a storage capacitor element 309.

The active matrix substrate 300 includes a plurality of gate bus lines 304 extending in parallel to one another, and a plurality of source bus lines 305 extending in parallel to one another so as to cross the gate bus lines 304 (typically at right angles). Each of the source bus lines 305 meanders in a rectangular wave pattern.

A TFT 306 is provided in the vicinity of each of the intersections between the gate bus lines 304 and the source bus lines 305. The TFT 306 is electrically connected to both the gate bus line 304 and the source bus line 305, and one end thereof is connected to the pixel electrode 307 via a drain electrode 316. The pixel electrodes 307 are arranged in a delta arrangement.

The TFT 306 is connected to a semiconductor layer 312 of the storage capacitor element 309 (hereinafter "the semiconductor layer 312 of the storage capacitor element 309" is referred to also as "a storage capacitor electrode 312a"). The storage capacitor element 309 includes a storage capacitor line 308 extending parallel to the gate bus line 304.

The active matrix substrate 300 has the same structure as that of the active matrix substrate 200 of Embodiment 2 except for the arrangement of the storage capacitor element 309. The storage capacitor element 309, which is different from Embodiment 2, will now be described in detail.

The storage capacitor electrode 312a, which is electrically connected to a first pixel electrode 307a, is formed in a horizontally elongated shape extending in the direction in which the gate bus lines 304 extend. As shown in FIG. 12, the storage capacitor electrode 312a overlaps a third pixel electrode 307c but does not at all overlap a second pixel electrode 307b. Therefore, also in the active matrix substrate 300, as in the active matrix substrate 200 of Embodiment 2, the capacitance value of the parasitic capacitor Cpsno, which promotes the occurrence of the luminance difference among horizontal lines (horizontal stripes), is smaller than the capacitance value of the parasitic capacitor Cpss1, which reduces the occurrence of the luminance difference among horizontal lines (horizontal stripes). Thus, it is possible to realize a desirable image display quality.

Embodiment 4

Figure 13:
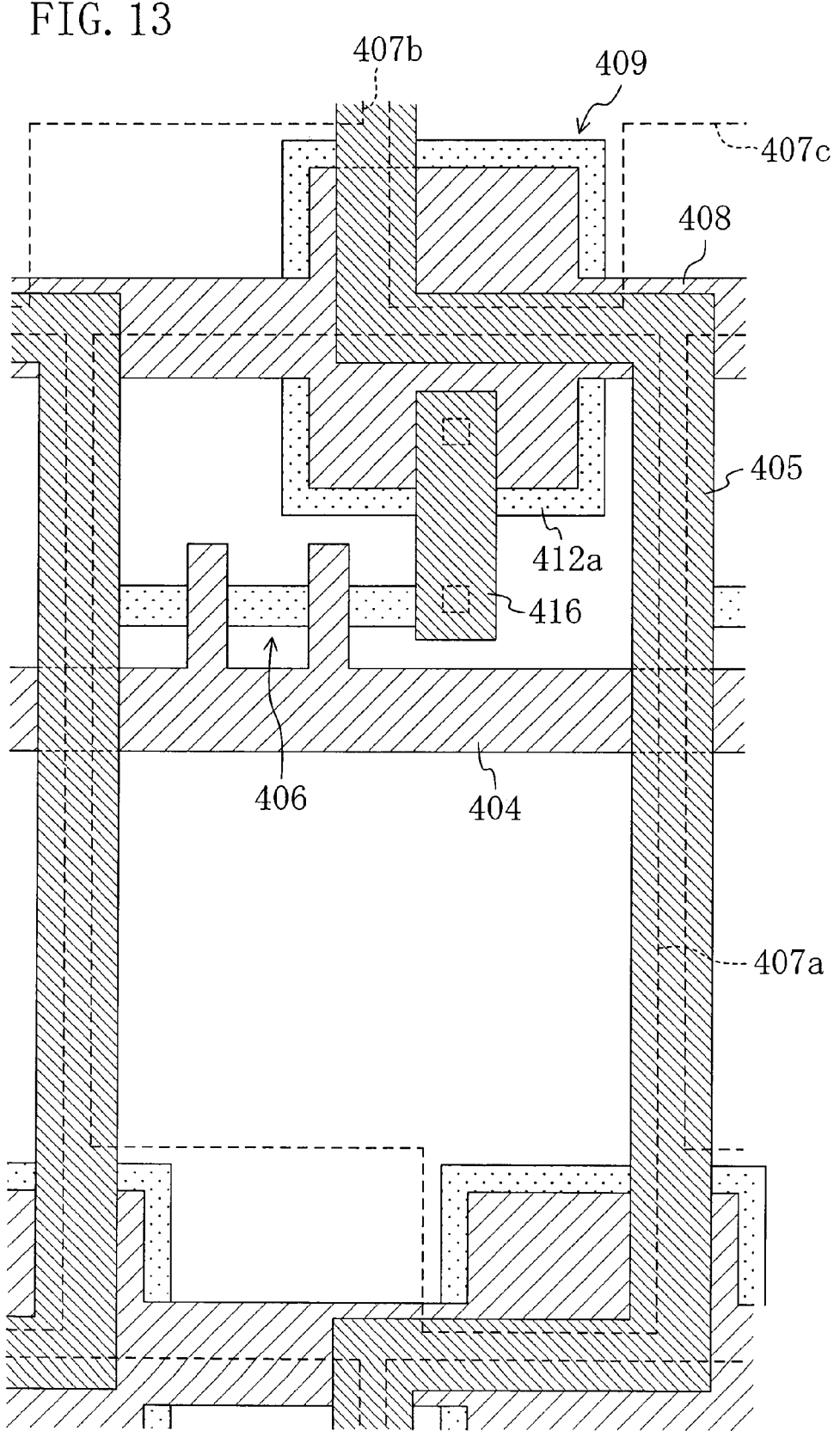
FIG. 13 is a partial plan view showing an active matrix substrate 400 of Embodiment 4.

FIG. 13 is a partial plan view showing an active matrix substrate 400 of Embodiment 4.

Figure 14:
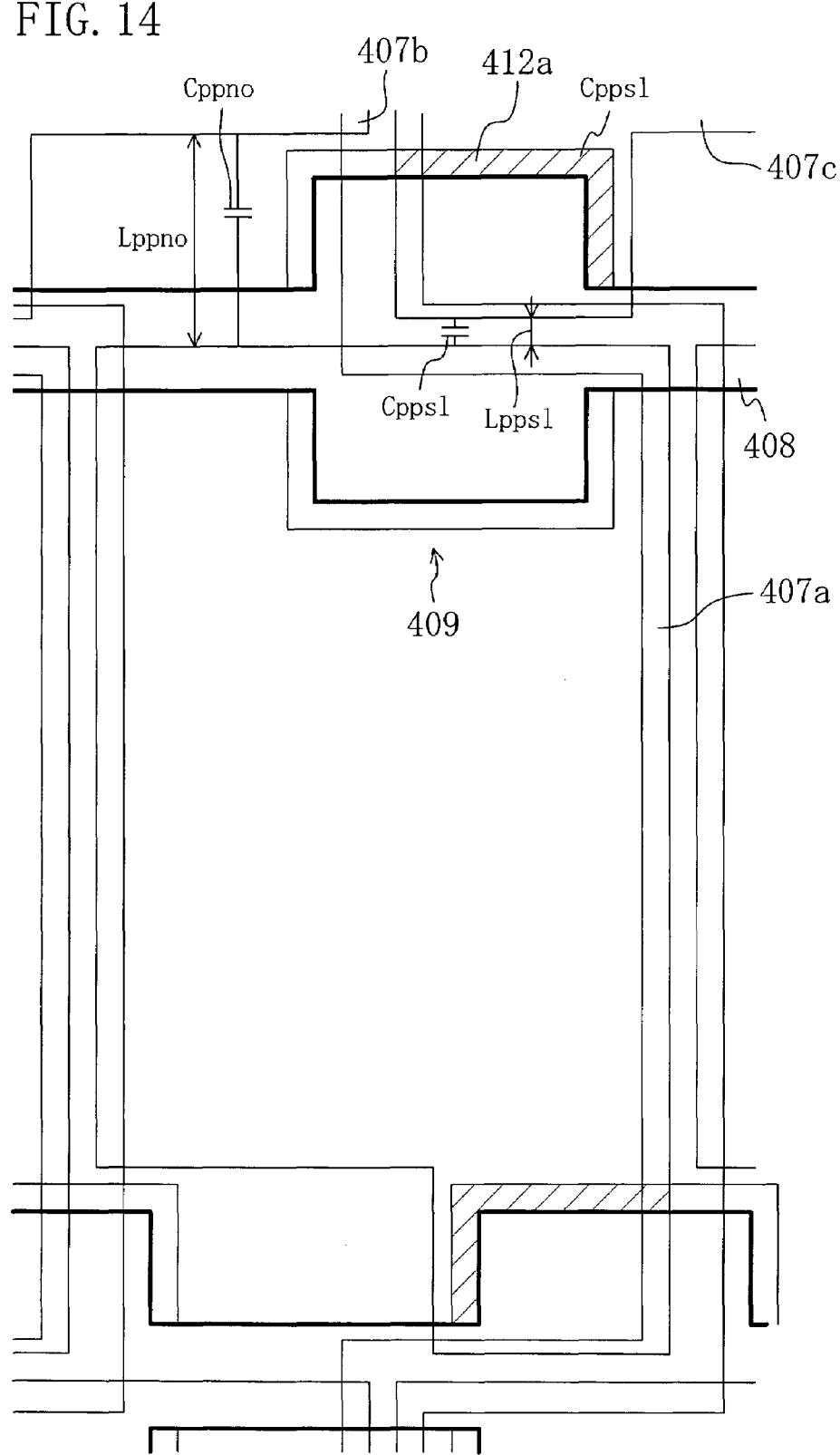
FIG. 14 is a plan view for illustrating the positional relationship between a pixel electrode 407 and a storage capacitor element 409.
Figure 15:
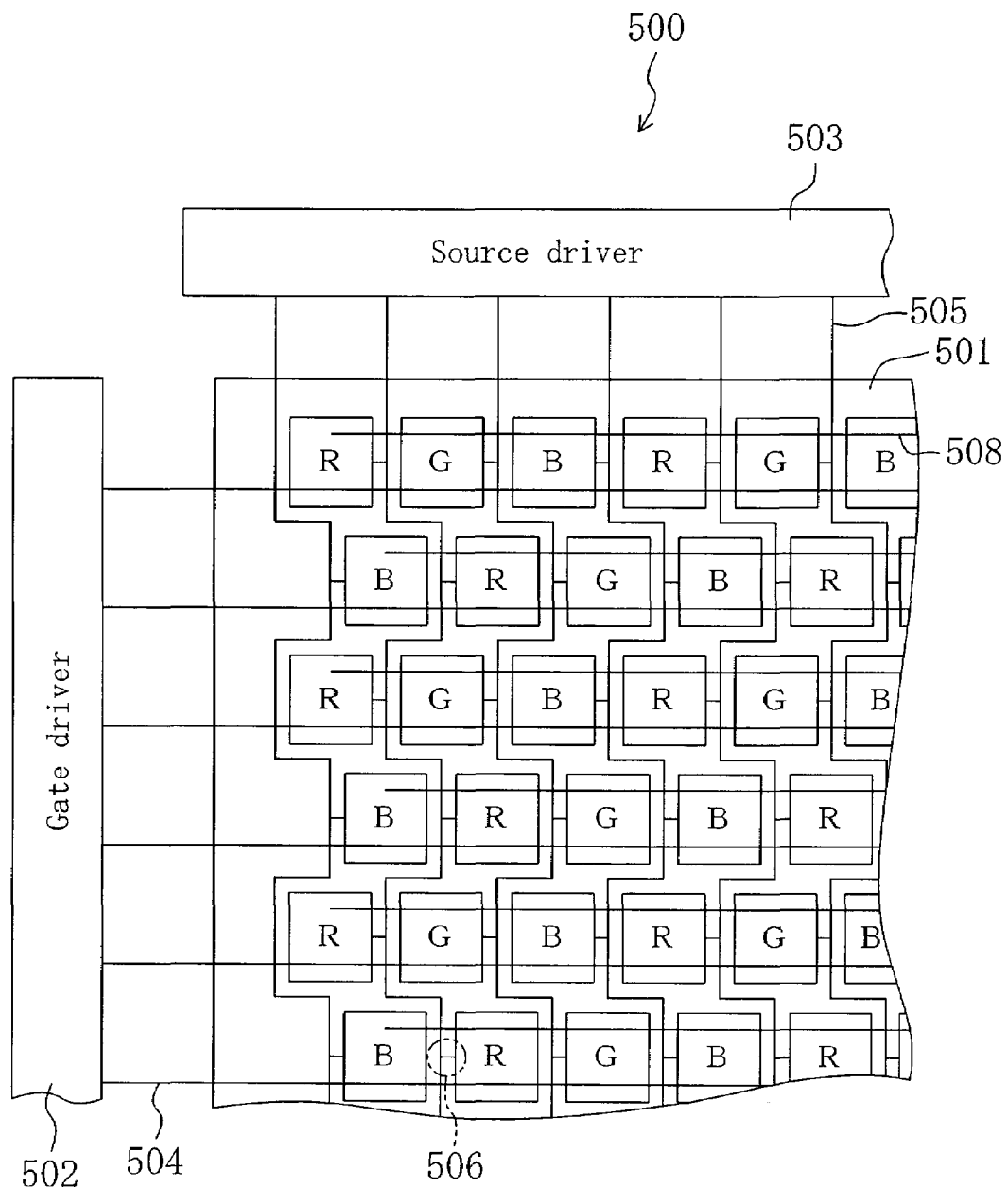
FIG. 15 is a schematic plan view showing an active matrix substrate 500 of a conventional liquid crystal display device having pixels arranged in a delta arrangement.
Figure 16:
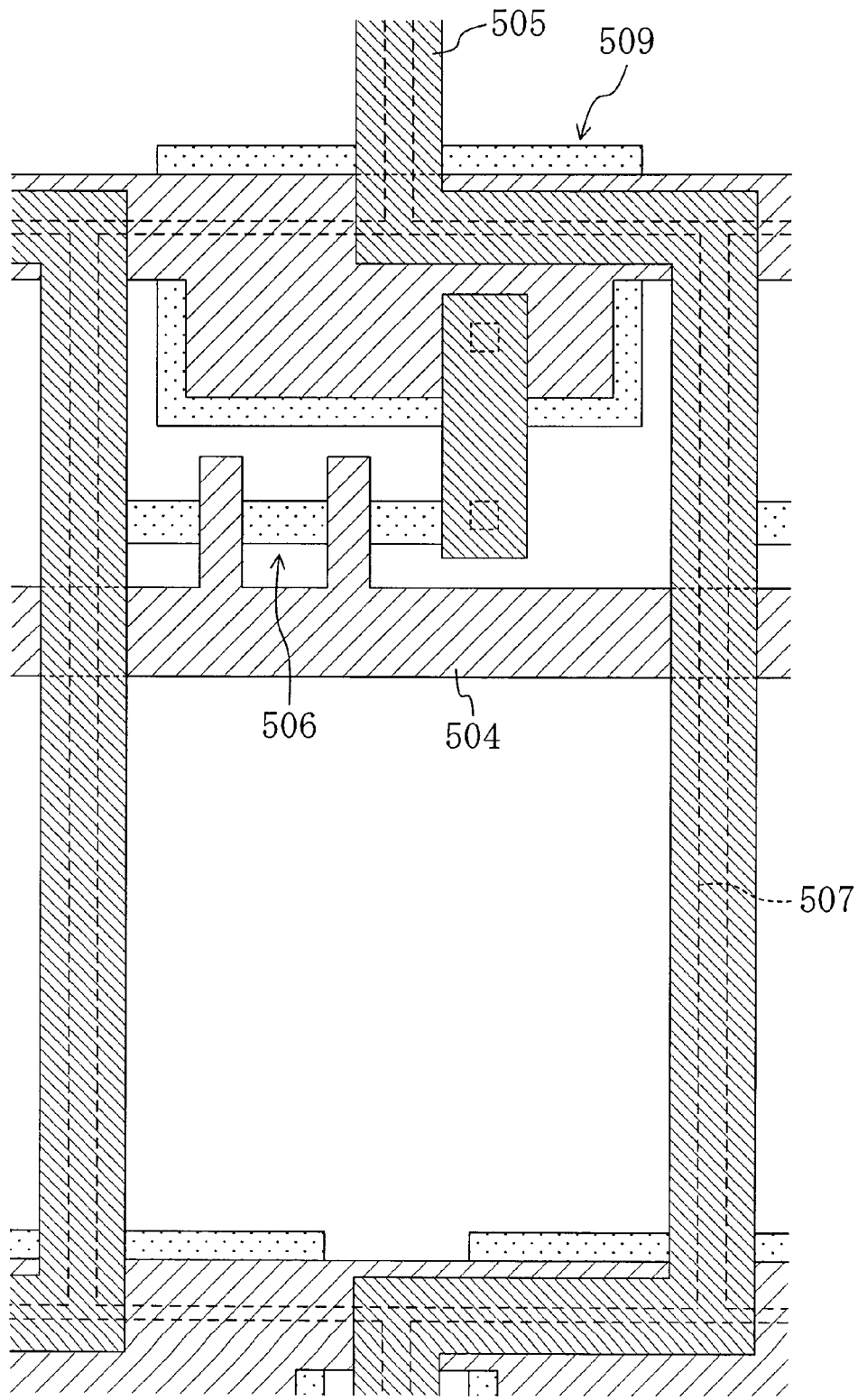
FIG. 16 is a partial plan view showing, on an enlarged scale, a portion of the active matrix substrate 500.
Figure 17:
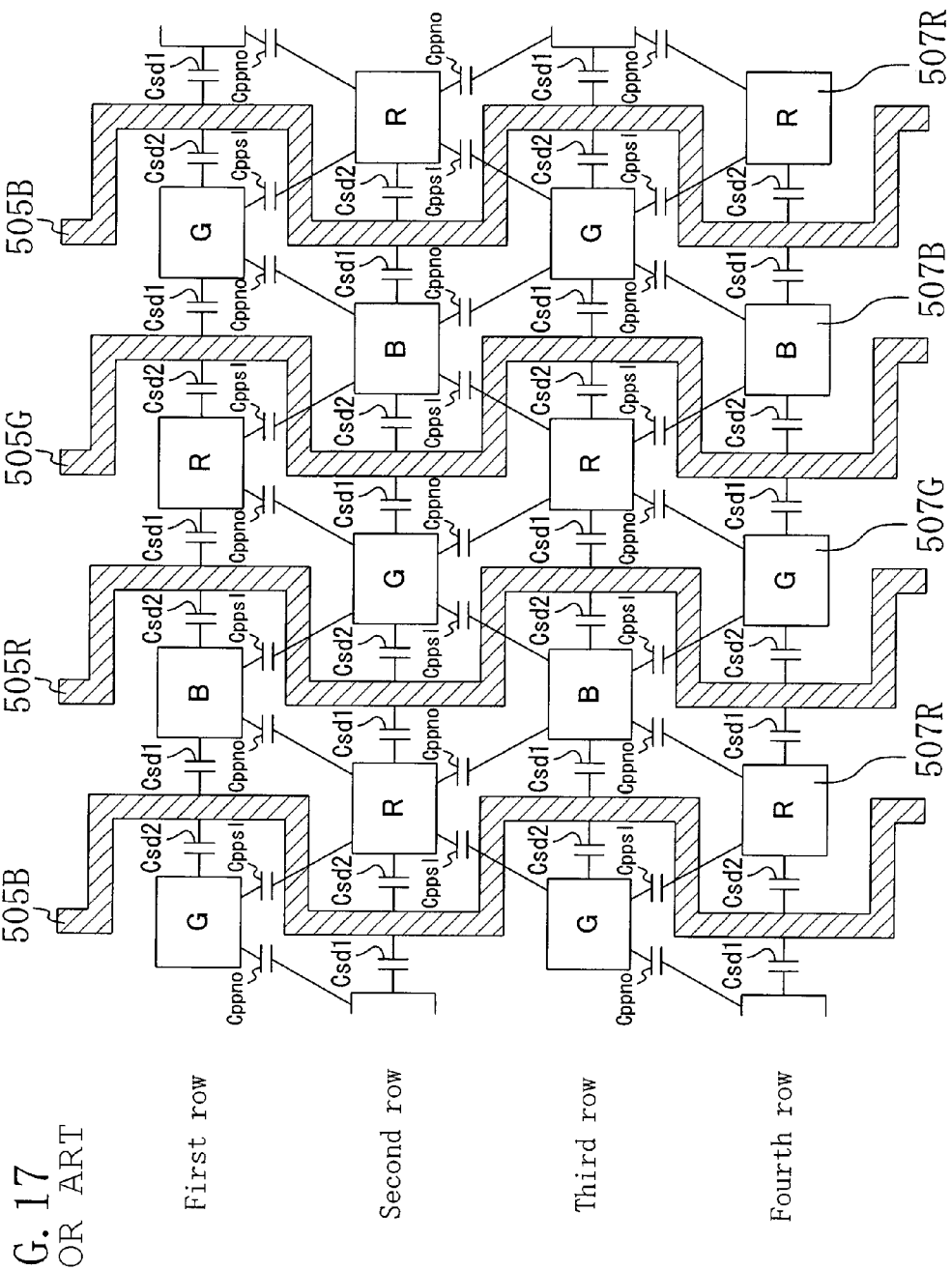
FIG. 17 is a plan view schematically showing a parasitic capacitor formed in the active matrix substrate 500.

FIG. 14 is a plan view for illustrating the positional relationship between a pixel electrode 407 and a storage capacitor element 409.

The active matrix substrate 400 includes a plurality of gate bus lines 404 extending in parallel to one another, and a plurality of source bus lines 405 extending in parallel to one another so as to cross the gate bus lines 404 (typically at right angles). Each of the source bus lines 405 meanders in a rectangular wave pattern.

A TFT 406 is provided in the vicinity of each of the intersections between the gate bus lines 404 and the source bus lines 405. The TFT 206 is electrically connected to both the gate bus line 404 and the source bus line 405, and one end thereof is connected to the pixel electrode 407 via a drain electrode 416. The pixel electrodes 407 are arranged in a delta arrangement.

The TFT 406 is connected to a semiconductor layer 412 of the storage capacitor element 409 (a storage capacitor electrode). The storage capacitor element 409 includes a storage capacitor line 408 extending parallel to the gate bus line 404.

The active matrix substrate 400 has the same structure as that of the active matrix substrate 200 of Embodiment 2 except for the shape of the pixel electrode 407. Therefore, also in the active matrix substrate 400, the capacitance value of the parasitic capacitor Cpsno, which promotes the occurrence of the luminance difference among horizontal lines (horizontal stripes), is smaller than the capacitance value of the parasitic capacitor Cpss1, which reduces the occurrence of the luminance difference among horizontal lines (horizontal stripes). Thus, it is possible to realize a desirable image display quality.

Moreover, in the active matrix substrate 400, the distance Lppno between a first pixel electrode 407a and a second pixel electrode 407b is longer than the distance Lpps1 between the first pixel electrode 407a and a third pixel electrode 407c. Therefore, the capacitance value of the parasitic capacitor Cppno is smaller than the capacitance value of the parasitic capacitor Cppsl.

The parasitic capacitor Cppno promotes the occurrence of the luminance difference among horizontal lines (horizontal stripes). On the other hand, the parasitic capacitor Cppsl suppresses the occurrence of the luminance difference among horizontal lines (horizontal stripes). Therefore, with the active matrix substrate 100, it is possible to effectively suppress the occurrence of the luminance difference among horizontal lines (horizontal stripes) and to realize a desirable image display quality.

As described above, the electrode substrate (active matrix substrate) of the present invention is useful in a display device such as a liquid crystal display device or an EL display device, a digital still camera, a digital video camera, or the like, having a display function.

The invention claimed is:

1. An electrode substrate, comprising:
    a first signal line, a second signal line and a third signal line extending in a first direction and in parallel to one another;
    a first pixel electrode electrically connected to the first signal line;
    a second pixel electrode being adjacent to the first pixel electrode in the first direction, and being electrically connected to the second signal line; and
    a third pixel electrode being adjacent to the second pixel electrode in a second direction, crossing the first direction, via the second signal line therebetween, and being electrically connected to the third signal line,
    wherein a capacitance value of a parasitic capacitor formed between the first pixel electrode and the second pixel electrode is smaller than a capacitance value of a parasitic capacitor formed between the first pixel electrode and the third pixel electrode.

2. The electrode substrate of claim 1, wherein a distance between the first pixel electrode and the second pixel electrode is longer than a distance between the first pixel electrode and the third pixel electrode.

3. An electrode substrate, comprising:
    a first signal line, a second signal line and a third signal line extending in a first direction and in parallel to one another;
    a first pixel electrode electrically connected to the first signal line;
    a second pixel electrode being adjacent to the first pixel electrode in the first direction, and being electrically connected to the second signal line;
    a third pixel electrode being adjacent to the second pixel electrode in a second direction, crossing the first direction, via the second signal line therebetween, and being electrically connected to the third signal line; and
    a storage capacitor element including a storage capacitor electrode electrically connected to the first pixel electrode,
    wherein a capacitance value of a parasitic capacitor formed between the storage capacitor electrode and the second pixel electrode is smaller than a capacitance value of a parasitic capacitor formed between the storage capacitor electrode and the third pixel electrode.

4. The electrode substrate of claim 3, wherein a distance between the storage capacitor electrode and the second pixel electrode is longer than a distance between the storage capacitor electrode and the third pixel electrode.

5. The electrode substrate of claim 3 wherein an area across which the storage capacitor electrode and the second pixel electrode overlap each other is smaller than an area across which the storage capacitor electrode and the third pixel electrode overlap each other.

6. The electrode substrate of claim 5, wherein the storage capacitor electrode and the third pixel electrode do not overlap each other.

7. The electrode substrate of claim 1, wherein the first signal line, the second signal line and the third signal line each meander in a rectangular wave pattern.

8. The electrode substrate of claim 3, wherein the first signal line, the second signal line and the third signal line each meander in a rectangular wave pattern.

9. The electrode substrate of claim 7, wherein the first pixel electrode, the second pixel electrode and the third pixel electrode are arranged in a delta pattern.

10. The electrode substrate of claim 8, wherein the first pixel electrode, the second pixel electrode and the third pixel electrode are arranged in a delta pattern.

11. A display device, comprising the electrode substrate of claim 1.

12. A display device, comprising the electrode substrate of claim 3.

* * * * *